July 30, 1940.  C. A. OTTO  2,209,844

DAMPER

Filed Jan. 14, 1938  3 Sheets-Sheet 1

Inventor
Carl A. Otto
By
Dodge and Sons
Attorneys

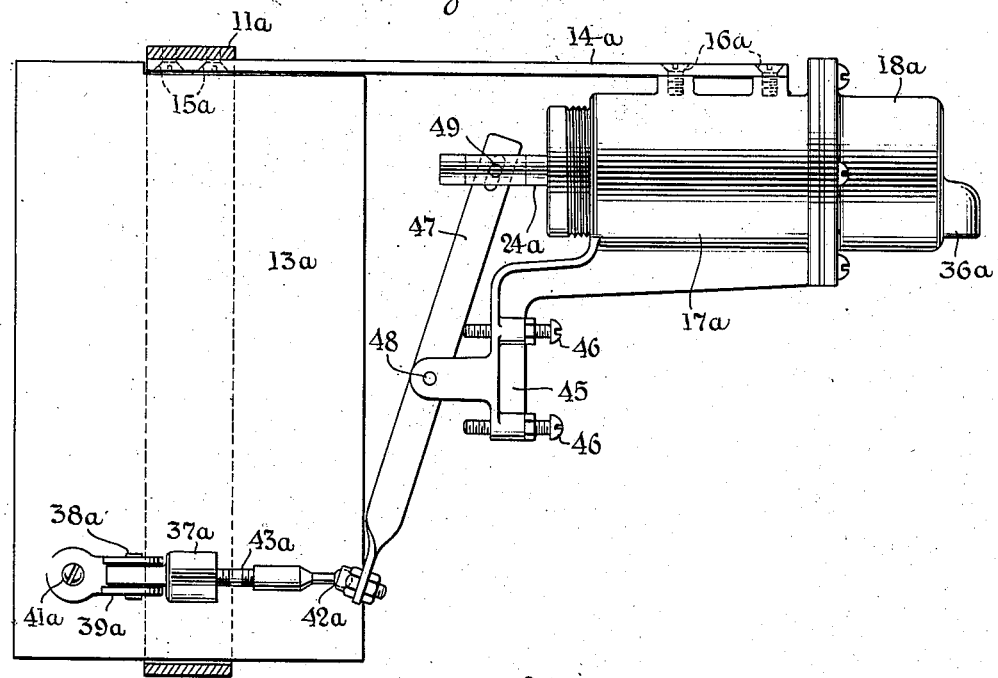
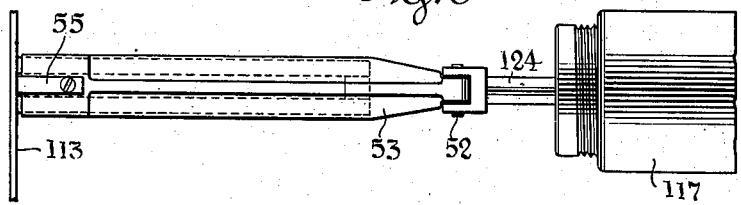
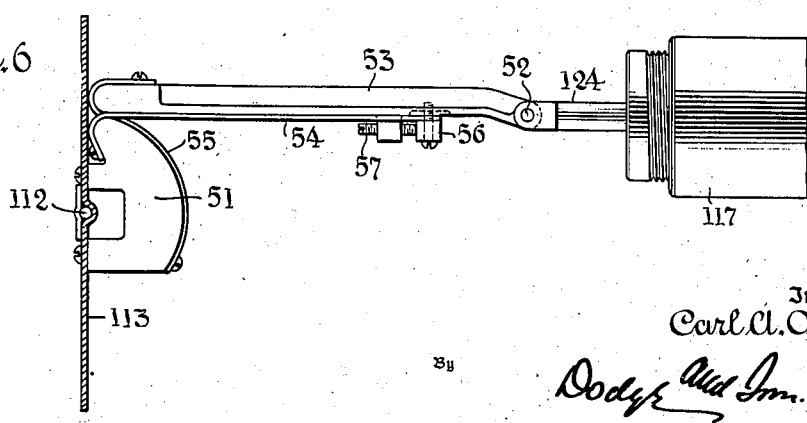

July 30, 1940. C. A. OTTO 2,209,844
DAMPER
Filed Jan. 14, 1939 3 Sheets-Sheet 3
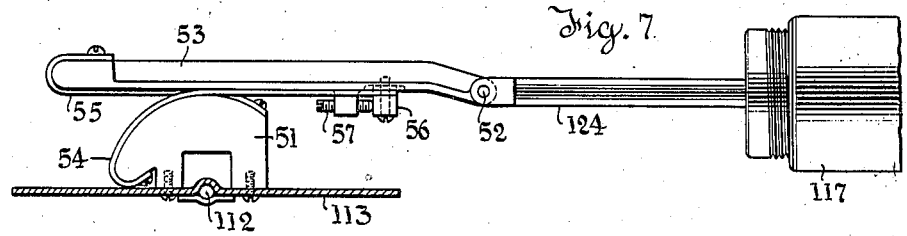
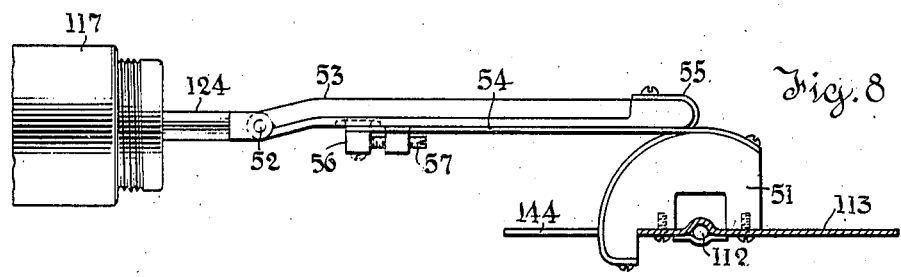
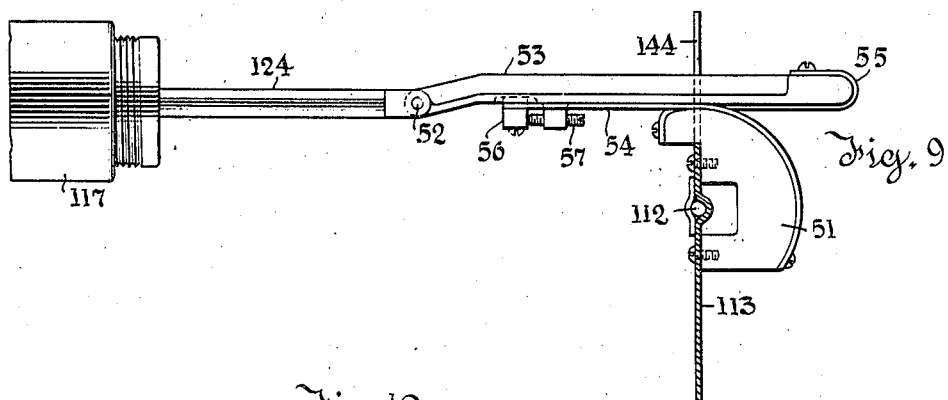
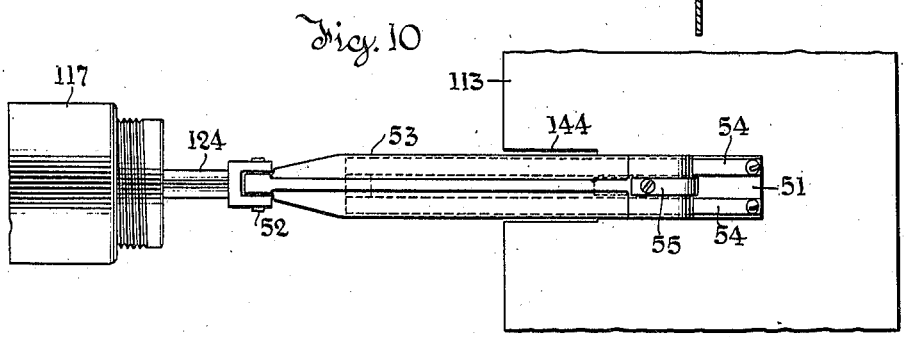
Inventor
Carl A. Otto
By Dodge
Attorneys Patented July 30, 1940

2,209,844

UNITED STATES PATENT OFFICE 2,209,844

DAMPER

Carl A. Otto, Milwaukee, Wis., assignor to Johnson Service Company, Milwaukee, Wis., a corporation of Wisconsin Application January 14, 1938, Serial No. 185,060

7 Claims. (Cl. 137—153)

This invention relates to damper actuating motors used in heating, ventilating and air conditioning.

There are a number of requirements in this class of service which have never heretofore been adequately met. First, silent operation is a primary requisite. In many cases, the damper must be moved to a definite position corresponding to a definite motive pressure. In view of this, the motor must be characterized by low friction and must have stable operating characteristics, irrespective of the position which it assumes.

The above named characteristics have led to the use, almost universally, of some form of diaphragm, usually a normally flat diaphragm of elastic material. The range of motion of such a diaphragm is obviously limited, and the effective area of the diaphragm is much less than its actual area because only the central portion of the diaphragm has a full range of motion. In order to get a sufficient range of motion to operate the damper, it has been necessary to interpose between the diaphragm and the damper a motion multiplying lever mechanism. This entails a further increase in the size of the diaphragm because the diaphragm is at a mechanical disadvantage.

Most damper motors are mounted in confined spaces and it is commonly necessary to mount the damper motor in the duct leading to the damper. With the latter arrangement, a large damper motor is seriously objectionable, because it reduces the effective area of the duct.

The present invention produces a damper motor and operating connections between the damper motor and the damper which overcome or, at any rate, minimize the difficulties above enumerated.

Very generally stated, the motor comprises what might be called a cylinder element and a piston element, the piston element offering a definite clearance between itself and the cylinder element, which interval is closed by a rolling seal made up of a tube of specially compounded rubber, one end of which is fastened to the cylinder element and the other end of which is fastened to the head of the piston element. The piston element is guided at its center by means specially provided for that purpose. This construction has a number of advantages. In the first place, within practical limits, the stroke of the piston can be made anything desired. By making the stroke of the piston long, it is unnecessary to interpose a motion multiplying lever connection between the piston and the damper. Consequently, the piston can be given the smallest practicable dimensions.

Furthermore, the entire area of the piston is effective, a fact which also assures of a minimum size of motor. The rolling rubber tube packing offers slight frictional resistance to the motion of the piston, and, consequently, the piston moves against the return spring quite accurately in proportion to the pressure exerted upon it. Consequently, the motor can be mounted against the side of the duct with its axis parallel to the direction of flow through the duct. In this position, the motor occupies the minimum transverse area in the duct. Finally, since no multiplying connections are necessary, the motor can be very simply connected to the damper and can be connected thereto by a number of different mechanisms, each of which may be adapted to the particular problem encountered in a given installation.

Thus, by a combination of a number of features, many of which individually considered are not broadly new, there is produced a damper motor mechanism of great practical utility, and one free from objections heretofore considered unavoidable.

The invention will now be described in connection with the accompanying drawings, in which:

In Fig. 2, as in Fig. 1, the damper is shown closed, but the open position is indicated in Fig. 2 in dotted lines.

Figure 3:
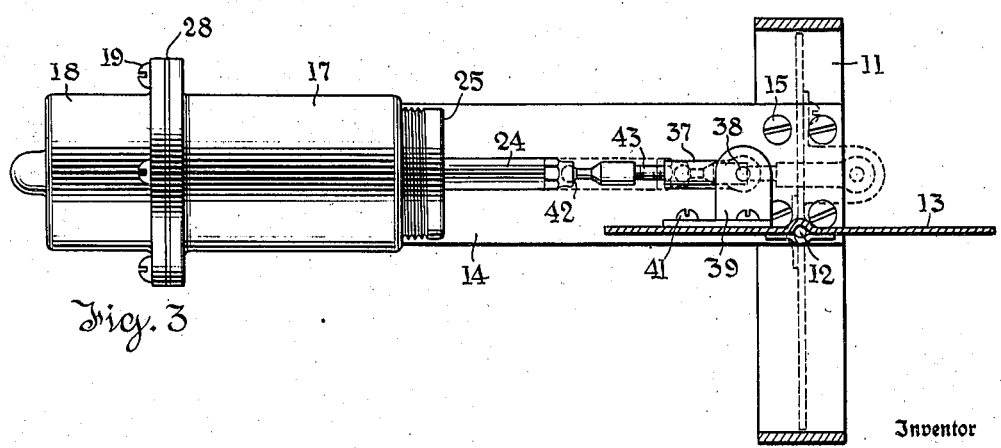

Fig. 3 is a similar view showing the bracket reversed with reference to the damper frame and indicating how the same damper motor may be used to operate the damper in a reverse sense. To do this the damper blade must be slotted to clear the connecting rod between the damper and the motor. In this view, the damper is shown open in full lines and closed in dotted lines.

Figure 1:
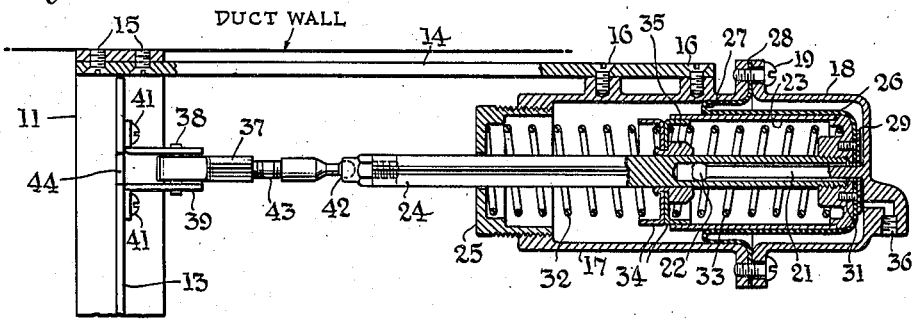
Figure 1 shows the improved damper motor in longitudinal section, with the motor mounted on a bracket attached to the damper frame, and the piston rod directly linked to the damper element.

Fig. 4 shows a modified form of damper motor including a bracket and rock lever, which is another means by which a damper motor mounted as indicated in Fig. 1 may be caused to act reversely on the damper.

Fig. 5 is an elevation showing a modified form of connection between the damper motor and the damper blade.

Figs. 6 and 7 are plan views of the mechanism shown in Fig. 5, showing, respectively, the closed and the open position of the damper.

Figs. 8 and 9 are views similar to Figs. 7 and 6, but indicating the damper motor mounted on the opposite side of the damper frame so as to operate the dampers in the reverse sense. To permit this, the damper blade must be slotted to clear the actuating connection.

Fig. 10 is an elevation of the structure shown in Figs. 8 and 9, showing how the damper blade is slotted. In Fig. 10 the damper is shown open as in Fig. 8.

Figure 2:
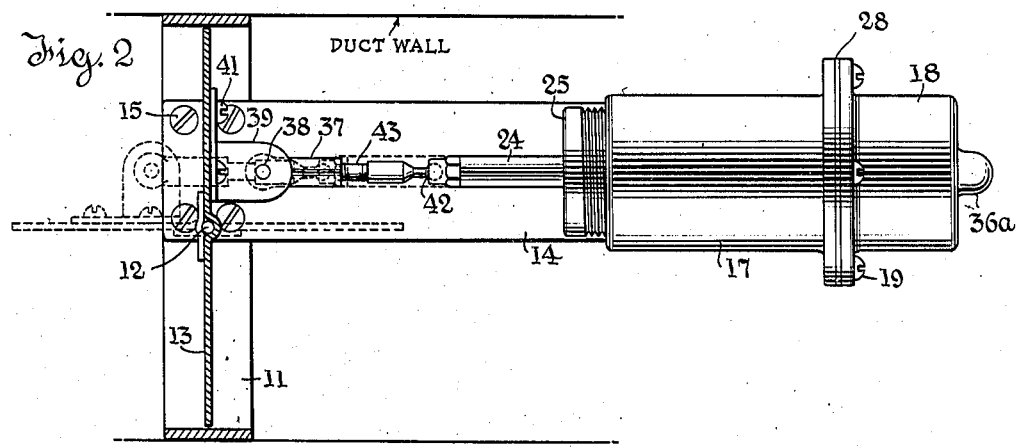
Fig. 2 is an elevation looking from the lower side with reference to Fig. 1.

To simplify Figs. 5 to 10, inclusive, the damper frame and the mounting bracket for the motor have been omitted, but it will be understood that these parts conform generally to the corresponding parts shown in Figs. 1 to 3, inclusive.

Referring first to Figs. 1 and 2, the damper frame is shown at 11 and may be assumed to be rectangular. Mounted on the pivot 12 in this frame is shown a single louver damper 13. This is chosen as the simplest type of damper without, however, implying exclusion of other types of damper, such as multiple louver dampers common in the art.

Projecting at right angles from the plane of the damper frame 11 is an arm 14. This is removably connected to the frame by the screws 15, and is arranged to extend along the wall of the duct in which the frame 11 is intended to be mounted. Removably mounted on the bracket 14 by means of the screws 16 is the cylinder made up of a body 17 and a head 18 fastened together by machine screws 19. The head 18 carries an axially extending guide support 21 terminating in a ball-shaped guiding head 22.

The piston comprises a cup-shaped element 23 with a rigidly attached piston rod 24 which is counterbored at its head end to receive the guide rod 21, which thus serves to center the piston and rod in the cylinder. The rod 24 is further guided by a combined guide and adjustable spring seat 25 which is threaded into the end of the cylinder body 17.

To form an air-tight connection between the piston member 23 and the cylinder, use is made of a tubular closing member 26 which is formed of an oxidation-resisting rubber compound, or the equivalent, and is folded upon itself as indicated at 27, at which point it offers a rolling seal between the cylinder and the piston. To hold the closing member in place and to secure a tight joint, it is flanged outward at one end as indicated at 28 and clamped between the body 17 and head 18 which make up the cylinder. The other end is flanged inward and clamped to the piston head by an annular plate 29 held by screws 31.

The tubular member 26 is preferably of soft rubber without fabric or other reinforcement. The clearance between piston and cylinder is so coordinated with the thickness of tube 26 that a free rolling action and minimum stretching at the fold are secured. This gives the least practicable friction, a very important consideration.

To urge the piston toward the head end of the cylinder, two springs 32 and 33 are arranged in tandem, their proximate ends being confined in a combined spring seat and guide 34. This is made up of two reversely arranged cup-like members clearly shown in the drawings as carried by a hub member 35 which is slidable on the rod 24. The cup-like members are also slidable within the piston 22. The initial stress on the spring may be determined by turning the spring seat 25 so as to adjust it axially. This construction produces a long return spring which is guided at mid-length. The spring offers a gradually increasing resistance to the displacement of the piston from its head end position (shown in Fig. 1). Pressure fluid to operate the piston is admitted through the connection 36.

The piston rod 24 is connected to the damper louver 13 by a very simple pitman arrangement. As shown in Fig. 1, a head 37 is pinned at 38 to clips 39 attached to the louver 13 by any suitable means such as screws 41. A ball and socket joint 42 of conventional form mounted on the end of the rod 24 is connected to the head 37 by a rod 43 whose opposite ends are reversibly threaded so that it serves as a sort of turnbuckle to adjust the effective length of the connection between the pin 38 and the ball joint 42. This permits adjustment to assure that the damper is just closed when the piston 22 is against the head of its cylinder.

Fig. 3 shows the parts indicated in Fig. 1 assembled in a slightly different relation. The bracket 14 is mounted on the frame 11 so as to extend in the opposite direction, so that when the motor is not under pressure the damper is open, and when the motor is under pressure the damper is closed. In this arrangement the slot 44, which is visible in Fig. 1 (but not there needed), offers clearance for the actuating connections between the motor and the damper, such clearance being necessary when the parts are arranged as in Fig. 3. While the slot 44 has been indicated in Fig. 1 and may always be present, it can be and often would be omitted where the mounting of the damper motor can be determined in advance as that shown in Fig. 1. However, reversible units which might be assembled in either way, so that the same motor will hold the same damper either normally opened or normally closed, are contemplated and this possibility is a feature of the invention.

Referring now to Fig. 4, a modified construction is shown. Here the damper motor is exactly that shown in Fig. 1 except that a cylinder portion 17a is substituted for the portion 17. This is formed with a bracket 45 with stop screws 46 for a lever 47 fulcrumed at 48 on the bracket. The lever 47 has a pin and slot connection 49 with the piston rod 24a. It is connected by way of clip 39a, pin 38a, sleeve 37a, ball joint 42a and double threaded rod 43a, to the damper 13a. This damper is mounted in a frame 11a and the motor is carried on the bracket 14a. In other words, the parts numbered with the letter a correspond with similar parts in Fig. 1. The effect is to reverse the action of the motor on the damper without requiring that the motor be mounted on the opposite side of the frame. Otherwise, the operative characteristics are the same.

Where the motor can be shifted to the opposite side of the frame as in Fig. 3, it is preferred to do so, but there are cases where this cannot be done. In such case, the scheme shown in Fig. 4 may be adopted. The effect is to keep the damper motor close to the side of the duct and, as far as practicable, outside of the path of air flow.

The structures shown in Figs. 1 to 4 have the advantage of simplicity, but the disadvantage for some uses that the angular motion of the damper is not proportional to the lineal displacement of the piston. Where this relationship is desirable, the arrangements shown in Figs. 5 to 10 may be adopted. To simplify structure, all supporting mechanism is omitted. The louver damper is indicated at 113 and is pivoted at 112.

A portion of the motor cylinder is indicated at 117 and the piston rod of the motor is indicated at 124. In other words, parts in Figs. 5 to 10 corresponding to parts in Fig. 1 are given the same reference numeral increased by 100.

Mounted on the louver 113 and concentric therewith is an arcuate pulley member 51. Pinned at 52 to the rod 124 is a connecting rod 53. This is in rolling contact with the member 51 except for the interposition of two reversely arranged straps 54 and 55 preferably of steel or bronze. One end of each strap is connected to the member 51, and the other end of each strap is connected to the member 53, the points of connection being so displaced as clearly shown in the drawings, that a rolling positive drive is afforded between the members 53 and 51. An adjustable tensioning device comprising a slide member 56 and thrust screw 57 is used to stress both of the straps 54 and 55 lightly in tension. Figs. 5 and 6 show the damper closed and the motor not under pressure. Fig. 7 shows the same structure with the damper open and the motor under pressure.

Figs. 8, 9 and 10 differ from Figs. 5, 6 and 7 very much as Fig. 3 differs from Figs. 1 and 2. That is to say, the motor is indicated as mounted on the opposite side of the damper frame with the result that in Fig. 8 the motor is vented and the damper is open, and in Fig. 9 the motor is under pressure and the damper is closed. Fig. 10 indicates how the damper louver 113 is slotted as indicated at 144. This slot is not needed when the parts are arranged as shown in Figs. 5, 6 and 7, and under those circumstances may be omitted. While the member 51 has a circular contour to secure uniform motion, any rolling contour may be substituted, subject, of course, to varying motion rate.

The purpose of illustrating a number of modifications is to bring out the fact that the motor can be mounted at the side of the duct in a position where it offers the least obstruction to air flow, and that the same motor may be used to open normally closed dampers or to close normally open dampers. Further, this motor can be used with conventional linkages where a uniform relation between piston displacement and angular displacement of the louvers is not necessary. Where such an arrangement is necessary a very simple driving mechanism may be substituted.

The most important aspect of the invention is the fact that it embodies a long stroke motor having low and uniform friction characteristics, and in which the total area of the piston is effective so that the motor can be made of the minimum possible diameter. Consequently, the motor is suited for mounting where the space limitations are severe, and particularly for mounting within the duct proper. Because of low friction it responds progressively to progressive changes of pressure and hence is suited for use, with so called gradual acting or "intermediate" pneumatic thermostats, extensively used in the art.

As a result of all these features, the invention meets in a peculiarly satisfactory and complete manner the numerous and conflicting requirements encountered in this particular service. While a number of modifications have been indicated, various others are possible within the scope of the invention. The description above given should be taken as illustrative, and not as limiting, the scope of the invention being defined in the claims.

What is claimed is:

1. The combination of a long stroke small bore motor including a cylinder and a piston; a damper frame; at least one louver damper pivotally mounted in said frame; a direct operating connection between said motor and the louver; and means for supporting said motor on one side of the plane of said frame with the axis of its cylinder substantially normal to said plane and the projected area of the cylinder within the area of the frame.

2. The combination defined in claim 1 in which the operating connection between the motor and louver comprises a rod shiftable longitudinally by the motor; a sector swinging with the louver and having rolling relation with the rod; and two straps reversely wound on the sector, each connected at opposite ends to sector and rod respectively.

3. The combination of a long stroke small bore pressure fluid motor comprising an elongated cylinder, an elongated single-acting piston smaller than said cylinder, and a rolling resilient seal interposed between the piston and cylinder, said seal comprising a tube turned to form an annular rolling fold and having at least the movable sealing portion of the tube made entirely of soft elastic rubber, whereby hysteresis in the motor is reduced to a minimum; a duct in which said motor is mounted with the axis of its cylinder extending substantially longitudinally of the duct so as to minimize obstruction of air flow therethrough by the motor; a movable damper for controlling the flow of air through said duct; a direct mechanical driving connection between the damper and piston; and spring means serving to urge the piston toward one limit of its motion, whereby there is assured at all times a substantially definite positioning of the damper by the piston corresponding to the particular motive fluid pressure which may be established in the motor cylinder.

4. A long stroke small bore motor adapted for direct actuation of dampers and the like comprising a cylinder; a single acting piston smaller than said cylinder and having a piston rod; guiding means co-acting with said rod to center said piston in said cylinder and to maintain an annular interval between the piston and the cylinder; a rolling resilient seal mounted in the cylinder between the cylinder and the piston; longitudinally-extended return spring means encircling said piston rod in spaced relation thereto and reacting against said piston; and guiding means engaging the middle of said spring means and serving to maintain the alignment thereof.

5. The combination of a long stroke small bore motor including a cylinder, a single-acting piston smaller than said cylinder, a rolling resilient tubular seal mounted in the cylinder between the cylinder and the piston, and a return spring for the piston; a damper frame; at least one louver damper pivotally mounted in said frame; a direct operating connection between said motor and lover; and means for supporting said motor on one side of the plane of said frame with the axis of its cylinder substantially normal to said plane and the projected area of the cylinder within the area of the frame.

6. The combination of a long stroke small bore pressure fluid motor including an elongated cylinder, an elongated single-acting piston smaller than said cylinder, means for guiding the piston axially in said cylinder so as to provide a substantially uniform annular interval between the piston and the cylinder, and a rolling resilient seal mounted in the cylinder between the cylinder and the piston, said seal comprising a tube encircling the piston and having at least its movable sealing portion made solely of soft elastic rubber, said tube being turned to produce an annular rolling fold and having one end sealed to the cylinder and the other sealed to the piston, the diameters of the piston and cylinder and the thickness of the tube being such that said annular interval between the piston and cylinder is relatively narrow and a relatively narrow annular operating clearance is provided between the opposed walls of the folded tube, whereby the resilient seal is supported sufficiently to provide the required bursting strength therein and hysteresis in the motor is reduced to a minimum; a duct in which said motor is mounted with the axis of its cylinder extending substantially longitudinally of the duct so that the motor occupies a minimum of transverse area in the duct; a movable damper for controlling the flow of air through said duct; a direct mechanical driving connection between the piston and the damper; and spring means for urging the piston toward one limit of its motion, whereby there is insured at all times movement of the damper by the piston into different substantially definite positions corresponding respectively to different motive fluid pressures which may be established in the motor cylinder.

7. The combination of a long stroke small bore pressure fluid motor including a cylinder, a piston smaller than said cylinder and arranged for operation therein, and a rolling tubular seal mounted in the cylinder between the cylinder and the piston; a duct in which said motor is mounted with the axis of its cylinder extending substantially longitudinally of the duct so as to minimize obstruction of air flow therethrough by the motor; a movable damper for controlling the flow of air through said duct; and an operating connection between said damper and said piston.

CARL A. OTTO.